United States Patent
Sakamoto et al.

(10) Patent No.: US 10,718,386 B2
(45) Date of Patent: Jul. 21, 2020

(54) CLUTCH CONTROL DEVICE

(71) Applicant: HONDA MOTOR CO., LTD., Tokyo (JP)

(72) Inventors: Naoki Sakamoto, Wako (JP); Shinya Nishiyama, Wako (JP); Dai Arai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 15/919,606

(22) Filed: Mar. 13, 2018

(65) Prior Publication Data

US 2018/0283478 A1  Oct. 4, 2018

(30) Foreign Application Priority Data

Mar. 29, 2017  (JP) ................... 2017-065795

(51) Int. Cl.
F16D 48/06 (2006.01)
F16D 48/10 (2006.01)
F16D 48/02 (2006.01)

(52) U.S. Cl.
CPC .......... *F16D 25/14* (2013.01); *F16D 48/10* (2013.01); *F16D 2500/3063* (2013.01); *F16D 2500/3168* (2013.01)

(58) Field of Classification Search
CPC ........... F16H 61/66259; F16H 61/0213; F16H 2061/0485; F16H 2061/0488;
(Continued)

(56) References Cited

U.S. PATENT DOCUMENTS 6,077,186 A * 6/2000 Kojima ................ B60K 6/48
477/3
6,344,016 B1 2/2002 Eguchi
(Continued)

FOREIGN PATENT DOCUMENTS

CN 1412034 A 4/2003
CN 102197236 A 9/2011
(Continued)

OTHER PUBLICATIONS

Chinese Office Action and Search Report for Chinese Application No. 201810268808.6, dated Jul. 25, 2019, with partial English translation.

*Primary Examiner* — Tinh Dang
(74) *Attorney, Agent, or Firm* — Birch, Stewart, Kolasch & Birch, LLP

(57) ABSTRACT

A basic pulse time setting section determines a basic pulse time for initial invalid stroke elimination by applying current values of oil temperature and throttle opening to the basic pulse time map. A subtraction time setting section determines a subtraction time by applying current values of oil temperature and clutch oil pressure to the subtraction time map. A pulse time determining section determines a predetermined initial invalid stroke elimination pulse time by subtracting the subtraction time from the basic pulse time. An initial invalid stroke elimination permission/inhibition determination section, at a starting timing of initial invalid stroke elimination, inhibits this-time initial invalid stroke elimination if the elapsed time from the execution timing of the preceding initial invalid stroke elimination is within the predetermined inhibition period.

12 Claims, 5 Drawing Sheets

(58) Field of Classification Search
CPC .......... F16H 2061/6614; B60W 10/06; B60W 10/08; B60W 10/023; B60W 10/107; B60W 20/30; B60W 30/18054; B60W 61/0213; B60W 2540/10; B60W 2710/083; F16D 48/02; F16D 48/06; F16D 48/066; F16D 2500/3056; F16D 2500/3067; F16D 2500/30806; F16D 2500/70406; F16D 2048/0233

See application file for complete search history.

(56) References Cited

U.S. PATENT DOCUMENTS

| | | | |
|---|---|---|---|
| 6,598,391 B2* | 7/2003 | Lunzman | E02F 9/226 60/327 |
| 7,041,030 B2* | 5/2006 | Kuroda | B60K 6/485 477/171 |
| 8,788,169 B2 | 7/2014 | Nedachi et al. | |
| 2003/0073540 A1 | 4/2003 | Eguchi et al. | |
| 2009/0299590 A1 | 12/2009 | Nedachi et al. | |
| 2011/0237389 A1 | 9/2011 | Ohashi et al. | |
| 2018/0216729 A1* | 8/2018 | Araki | F16D 48/02 |
| 2018/0245689 A1* | 8/2018 | Araki | F16H 61/143 |

FOREIGN PATENT DOCUMENTS

| | | |
|---|---|---|
| JP | 2001-032863 A | 2/2001 |
| JP | 2009-287606 A | 12/2009 |
| JP | 2012-036966 A | 2/2012 |

\* cited by examiner

CLUTCH CONTROL DEVICE

CROSS-REFERENCE TO RELATED APPLICATIONS

The present application claims priority under 35 USC 119 to Japanese Patent Application No. 2017-065795 filed Mar. 29, 2017 the entire contents of which are hereby expressly incorporated by reference.

TECHNICAL FIELD

The present invention relates to a clutch control device for applying a stand-by oil pressure for invalid stroke elimination to an oil passage of a friction plate type hydraulic clutch for effecting and interrupting transmission of a driving force between a drive wheel and an engine, particularly to a clutch control device capable of making appropriate the clutch oil pressure at the time of invalid stroke elimination.

BACKGROUND ART

A technology of invalid stroke elimination is disclosed in Patent Documents 1 and 2. In the technology, in order that a torque can be received on a transmission side without delay in relation to an input of an engine torque in response to an accelerator pedal operation, at the time when a starting clutch is transferred from a disengaged state into an engaged state, a stand-by oil pressure is applied to an oil passage of the starting clutch after disengagement of the starting clutch, to thereby reduce or eliminate a clearance generated in the clutch.

In Patent Document 3, there is disclosed a technology wherein a high pressure is exerted at an initial stage of invalid stroke elimination at which the throttle position starts to open from a fully closed state, and thereafter the pressure is suppressed to a low level, thereby completing the invalid stroke elimination.

Where a clutch piston is moved by thus applying the stand-by oil pressure until the invalid stroke is eliminated, it is ensured that when an oil pressure thereafter acts on the clutch piston, a forward clutch can immediately start engaging. Therefore, a quick gear shift can be performed.

CITATION LIST

Patent Literature

Patent Document 1: JP 2001-032863 A
Patent Document 2: JP 2009-287606 A
Patent Document 3: JP 2012-036966 A

SUMMARY OF INVENTION

Technical Problem

In the method wherein a high pressure is exerted at an initial stage of invalid stroke elimination and thereafter the pressure is suppressed to a low level as described in Patent Document 3, response property of the clutch is improved, and enhancement of the feeling at the time of starting of the vehicle can be expected.

However, there has been a technical problem that if ON/OFF operations of a throttle are repeated at a short period at the time of starting and the invalid stroke elimination and release thereof are repeated without reaching the starting of the vehicle, the clutch oil pressure tends to become excessive.

It is an object of the present invention to provide a clutch control device capable of maintaining clutch oil pressure in a normal range and making appropriate the clutch oil pressure even if ON/OFF operations of a throttle are repeated at a short period at the time of starting of a vehicle.

Solution to Problems

To achieve the afore-mentioned object, the present invention is characterized by following constitutions in a clutch control device for applying a stand-by oil pressure for invalid stroke elimination to an oil passage of a friction plate type hydraulic clutch for effecting and interrupting transmission of a driving force between a drive wheel and an engine, the clutch control device.

(1) The present invention comprises a means (50, 60) for generating an initial invalid stroke elimination oil pressure in excess of an invalid stroke elimination preparatory oil pressure for a predetermined time at the time of starting invalid stroke elimination which is started according to a throttle operation, means (50, 60) for generating the invalid stroke elimination preparatory oil pressure after the initial invalid stroke elimination and means (61) for inhibiting this-time initial invalid stroke elimination and continuing the invalid stroke elimination preparatory oil pressure when an elapsed time from execution of preceding initial invalid stroke elimination to a timing of the this-time initial invalid stroke elimination is within a predetermined inhibition period.

(2) The predetermined time is determined (10, 20) based on oil temperature and throttle opening.

(3) The present invention further comprises means (30, 40, 50) for shortening the predetermined time by a predetermined subtraction time according to an oil pressure (165) at an inlet passage of the hydraulic clutch at a starting timing of invalid stroke elimination.

(4) The inhibition period is determined based on oil temperature.

(5) The present invention further comprises an oil pressure restriction valve for restricting each oil pressure generated by a hydraulic pump to a predetermined oil pressure, wherein during the predetermined time, the oil pressure restriction valve is fully opened and the oil pressure from the hydraulic pump is introduced directly to the hydraulic clutch.

Advantageous Effects of the Invention

According to the present invention, the following effects are achieved.

(1) The initial invalid stroke elimination is inhibited from being performed again unless a predetermined inhibition period has elapsed from the execution of the preceding initial invalid stroke elimination. Therefore, the clutch pressure is prevented from being raised excessively due to repetition of the initial invalid stroke elimination in a short time.

(2) The predetermined time of the initial invalid stroke elimination is shortened according to the oil pressure at the starting timing thereof; therefore, an excessive initial invalid stroke elimination can be avoided even in the case where the initial invalid stroke elimination is started from a state in which the clutch oil pressure in a vehicle stop condition has not been sufficiently lowered due to such a reason as a low oil temperature.

(3) The inhibition period is prolonged in a situation in which the oil temperature is low and a swift lowering of the clutch oil pressure cannot be expected even if the valve opening is increased; therefore, the inhibition period is optimized notwithstanding the oil temperature, and the clutch oil pressure can be prevented from being raised excessively due to repetition of invalid stroke elimination in a short period.

BRIEF DESCRIPTION OF DRAWINGS

FIG. 4A depicts time charts of clutch oil pressure during control of invalid stroke elimination when starting of the vehicle is reached in the manner of interlocking with a starting operation of shifting the throttle from OFF to ON.

FIG. 5 is a block diagram depicting the configuration of an embodiment wherein the inhibition period Δtb is changed dynamically according to oil temperature TO.

DESCRIPTION OF EMBODIMENTS

Figure 1:
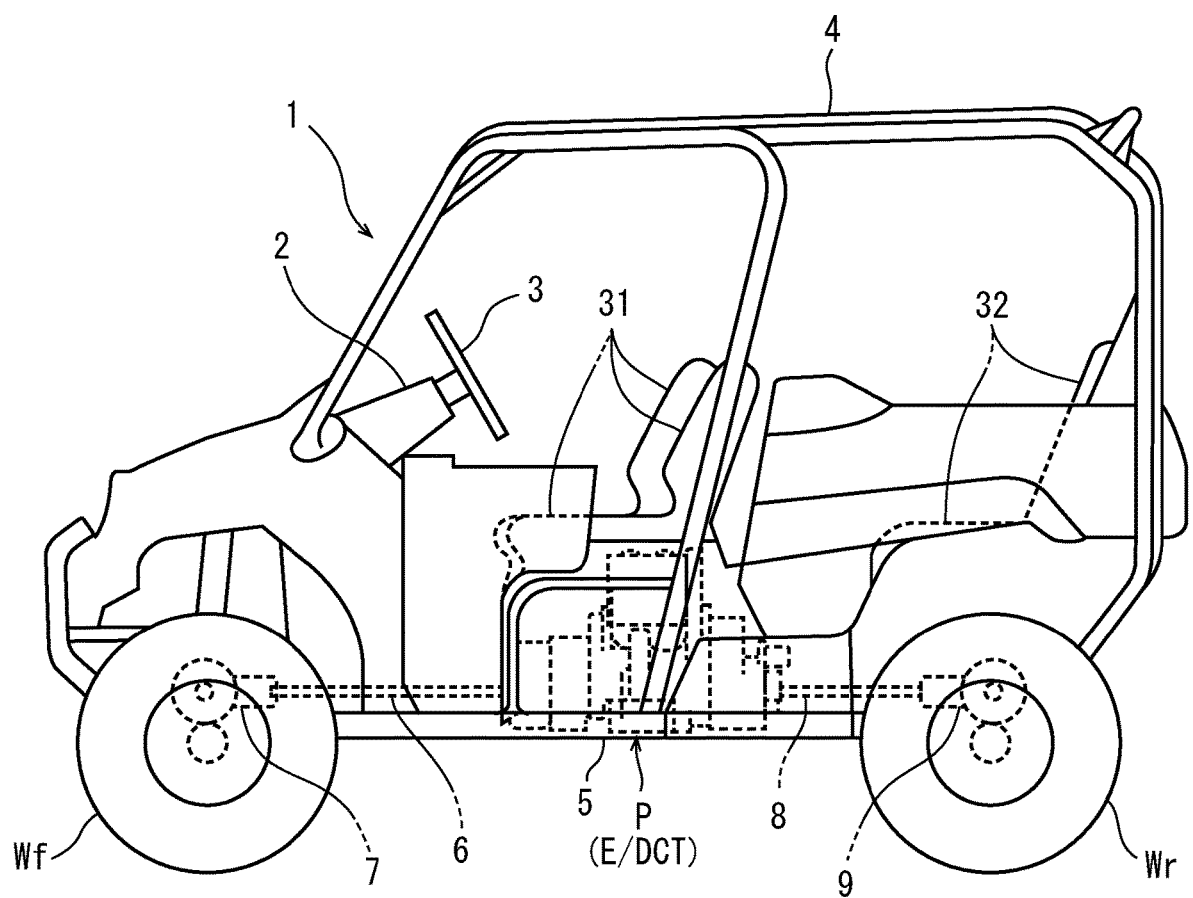
FIG. 1 is a side view of a rough terrain traveling vehicle having a DCT to which a hunting control device according to the present invention is applied.

In the following, a preferred embodiment of the present invention will be described in detail with reference to the drawings. FIG. 1 is a side view of a rough terrain traveling vehicle 1 having a DCT to which a hunting control device according to the present invention is applied.

A pair of left and right front wheels Wf and a pair of left and right rear wheels Wr that are fitted with tires for rough terrain use are respectively suspended from the front and rear of a vehicle body frame 5. A power unit P including an internal combustion engine E and a DCT is mounted in a longitudinally central position of the vehicle body frame 5. The output of the power unit P is transmitted to the left and right front wheels Wf via a front propeller shaft 6 and a front final reduction gear unit 7, and is transmitted to the left and right rear wheels Wr via a rear propeller shaft 8 and a rear final reduction gear unit 9.

Three front seats 10 are laterally arranged side by side over the power unit P. Two rear seats 11 are laterally arranged in a rear portion of the vehicle body frame 5. A steering wheel 3 is provided in front of a driver's seat so as to project from a steering column 2. A space over the front seats 10 and the rear seats 11 is covered by a roof 4.

Figure 2:
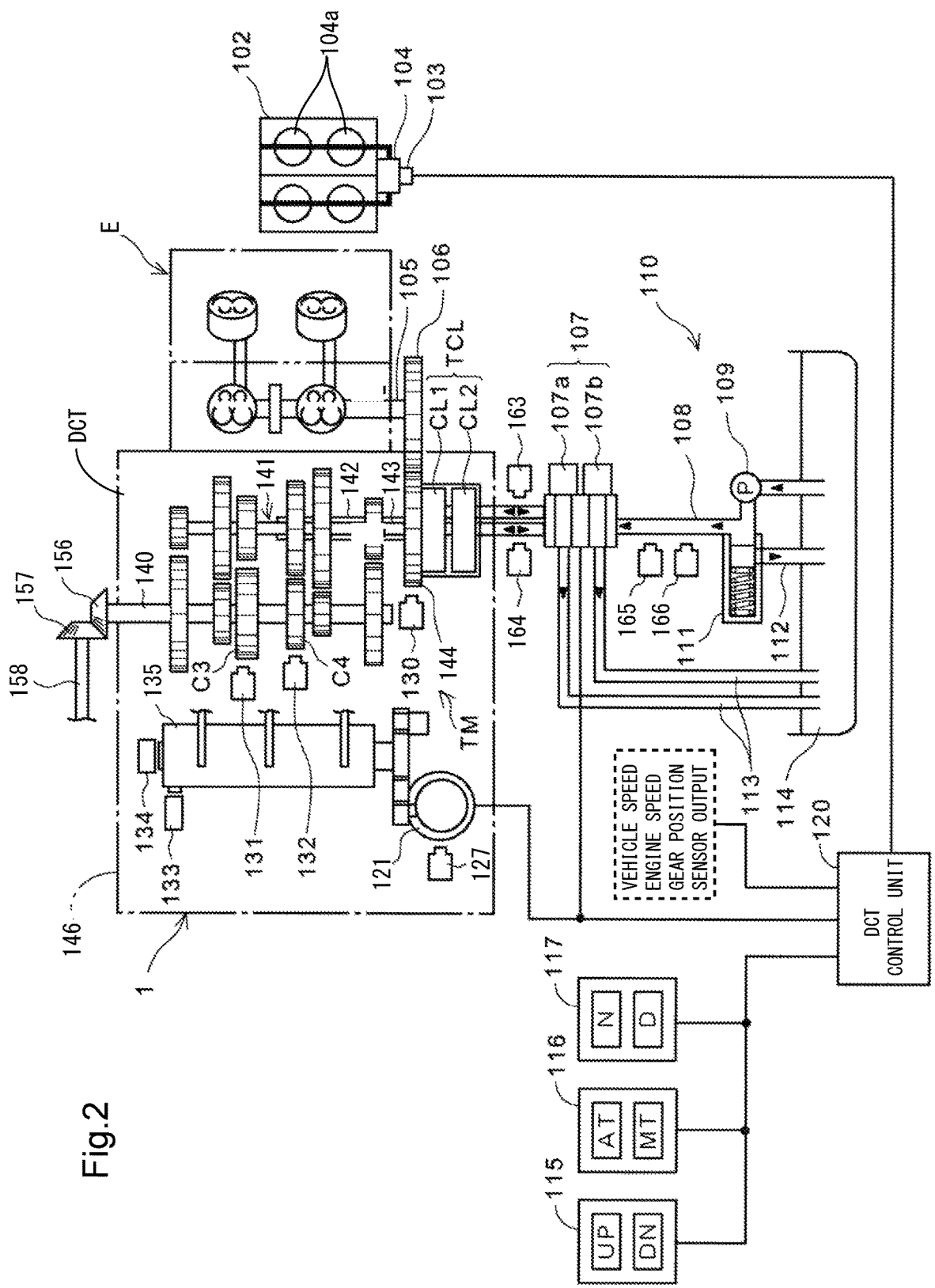
FIG. 2 is a diagram depicting a configuration of the DCT included in the power unit of the rough terrain traveling vehicle and a peripheral mechanism thereof.

FIG. 2 is a diagram depicting a configuration of the DCT included in the power unit P and a peripheral mechanism thereof. The DCT connects and disconnects the rotational driving force of the engine E by two clutches CL1 and CL2 arranged on a main shaft.

The DCT is housed in a crankcase 146, and is driving-controlled by a clutch hydraulic device 110 and a DCT control unit 120. The engine E has a throttle-by-wire type throttle body 102 provided with a throttle valve motor 104 that opens and closes throttle valves 104a.

The DCT includes a transmission TM with six forward gears, a twin clutch mechanism TCL constituted of a first clutch CL1 and a second clutch CL2, a shift drum 135, and a shift control motor 121 that rotates the shift drum 135.

A large number of gears constituting the DCT are each coupled or loosely fitted to the main shaft 141 or a counter shaft 140. The main shaft 141 is constituted of an inner main shaft 143 and an outer main shaft 142. The inner main shaft 143 is coupled to the first clutch CL1. The outer main shaft 142 is coupled to the second clutch CL2. The main shaft 141 and the counter shaft 140 are each provided with speed change gears displaceable in an axial direction of the main shaft 141 and the counter shaft 140. End portions of shift forks (not depicted) are each engaged with a plurality of guide grooves formed in the speed change gears and the shift drum 135.

An output shaft of the engine E, that is, a crankshaft 105 is coupled with a primary driving gear 106. The primary driving gear 106 meshes with a primary driven gear 144. The primary driven gear 144 is coupled to the inner main shaft 143 via the first clutch CL1, and is coupled to the outer main shaft 142 via the second clutch CL2.

The DCT includes an inner main shaft number-of-rotations (rotational speed) sensor 131 and an outer main shaft number-of-rotations (rotational speed) sensor 132 that detect the rotational speeds of the inner main shaft 143 and the outer main shaft 142, respectively, by measuring the rotational speeds of predetermined speed change gears on the counter shaft 140.

The inner main shaft number-of-rotations sensor 131 detects the rotational speed of a driven side speed change gear C3 that is meshed with a speed change gear non-rotatably attached to the inner main shaft 143 and which is rotatably and non-slidably attached to the counter shaft 140. The outer main shaft number-of-rotations sensor 132 is configured to detect the rotational speed of a driven side speed change gear C4 that is meshed with a speed change gear non-rotatably attached to the outer main shaft 142 and which is rotatably and non-slidably attached to the counter shaft 140.

A bevel gear 156 is coupled to an end portion of the counter shaft 140. The bevel gear 156 meshes with a bevel gear 157 coupled to a drive shaft 158. The rotational driving force of the counter shaft 140 is thereby transmitted to the rear wheels Wr.

The DCT includes: an engine speed sensor 130 disposed so as to be opposed to the outer circumference of the primary driven gear 144; a gear position sensor 134 that detects the gear stage position of the transmission on the basis of the rotational position of the shift drum 135; a shifter sensor 127 that detects the rotational position of a shifter driven by the shift control motor 121; and a neutral switch 133 that detects that the shift drum 135 is in a neutral position. The throttle body 102 is provided with a throttle opening sensor 103 that detects a degree of throttle opening.

The clutch hydraulic device 110 has a configuration used for both of a lubricating oil for the engine E and a hydraulic fluid driving the twin clutches. The clutch hydraulic device 110 has an oil tank 114 and a pipe line 108 for feeding an oil (hydraulic fluid) within the oil tank 114 to the first clutch CL1 and the second clutch CL2. A variable displacement hydraulic pump 109 as an oil pressure supply source and a valve 107 as an actuator are arranged on the pipe line 108. A regulator 111 for maintaining an oil pressure supplied to the valve 107 at a constant value is disposed on a return line 112 coupled to the pipe line 108. The valve 107 is constituted of a first valve 107a and a second valve 107b that can individually apply oil pressures to the first clutch CL1 and the second clutch CL2. The first valve 107a and the second valve 107b are each provided with an oil return line 113.

A pipe line coupling the first valve 107a and the first clutch CL1 to each other is provided with a first oil pressure sensor 163 that measures an oil pressure occurring in the pipe line, that is, an oil pressure occurring in the first clutch CL1. A pipe line coupling the second valve 107b and the second clutch CL2 to each other is provided with a second oil pressure sensor 164 that measures an oil pressure occurring in the second clutch CL2. The pipe line 108 coupling the hydraulic pump 109 and the valve 107 to each other is provided with a main oil pressure sensor 165 and an oil temperature sensor 166 as oil temperature detecting means.

The DCT control unit 120 is connected with a mode switch 116 that switches between an automatic speed change (AT) mode and a manual speed change (MT) mode, a shift selecting switch 115 that gives an upshift (UP) or downshift (DN) speed change instruction, and a neutral selecting switch 117 that switches between neutral (N) and drive (D).

The DCT control unit 120 includes a central processing unit (CPU). The DCT control unit 120 changes a speed change stage automatically or semiautomatically by controlling the valve 107 and the shift control motor 121 according to output signals of the sensors and the switches described above.

The DCT control unit 120 automatically changes a shift stage position according to information about a vehicle speed, an engine speed, a degree of throttle opening, and the like while the AT mode is selected. On the other hand, the DCT control unit 120 upshifts or downshifts the transmission TM according to an operation of the shift selecting switch 115 while the MT mode is selected. Incidentally, even when the MT mode is selected, auxiliary automatic speed change control can be performed to prevent overspeed or stalling of the engine.

In the clutch hydraulic device 110, the hydraulic pump 109 applies an oil pressure to the valve 107. The regulator 111 controls the oil pressure such that the oil pressure does not exceed an upper limit value. When the valve 107 is opened by an instruction from the DCT control unit 120, the oil pressure is applied to the first clutch CL1 or the second clutch CL2, so that the primary driven gear 144 is coupled to the inner main shaft 143 or the outer main shaft 142 via the first clutch CL1 or the second clutch CL2.

Specifically, the first clutch CL1 and the second clutch CL2 are both a hydraulic clutch of a normally open type. When the application of the oil pressure is stopped by closing the valve 107, a built-in return spring (not depicted) biases the first clutch CL1 and the second clutch CL2 in a direction of being decoupled from the inner main shaft 143 and the outer main shaft 142. A time taken for the pipe line 108 to reach a fully opened state from a fully closed state or the like can be changed arbitrarily by adjustment of a driving signal for the valve 107 by the DCT control unit 120.

The shift control motor 121 rotates the shift drum 135 according to an instruction from the DCT control unit 120. When the shift drum 135 is rotated, the shift forks (not depicted) are displaced in the axial direction of the shift drum 135 according to the shapes of guide grooves formed in the outer circumference of the shift drum 135. Engagements of the gears on the counter shaft 140 and the main shaft 141 are changed accordingly.

In the DCT, the inner main shaft 143 coupled to the first clutch CL1 is configured to support odd-numbered stage gears (first, third, and fifth gears), and the outer main shaft 142 coupled to the second clutch CL2 is configured to support even-numbered stage gears (second, fourth, and sixth gears). Hence, during traveling in the odd-numbered stage gears, oil pressure supply to the first clutch CL1 is continued, and a connected state thereof is maintained. When a shift change is performed, engagements of the gears are changed in advance by rotating the shift drum 135, and thus a speed change operation can be completed by only changing the connected states of both the clutches.

Figure 3:
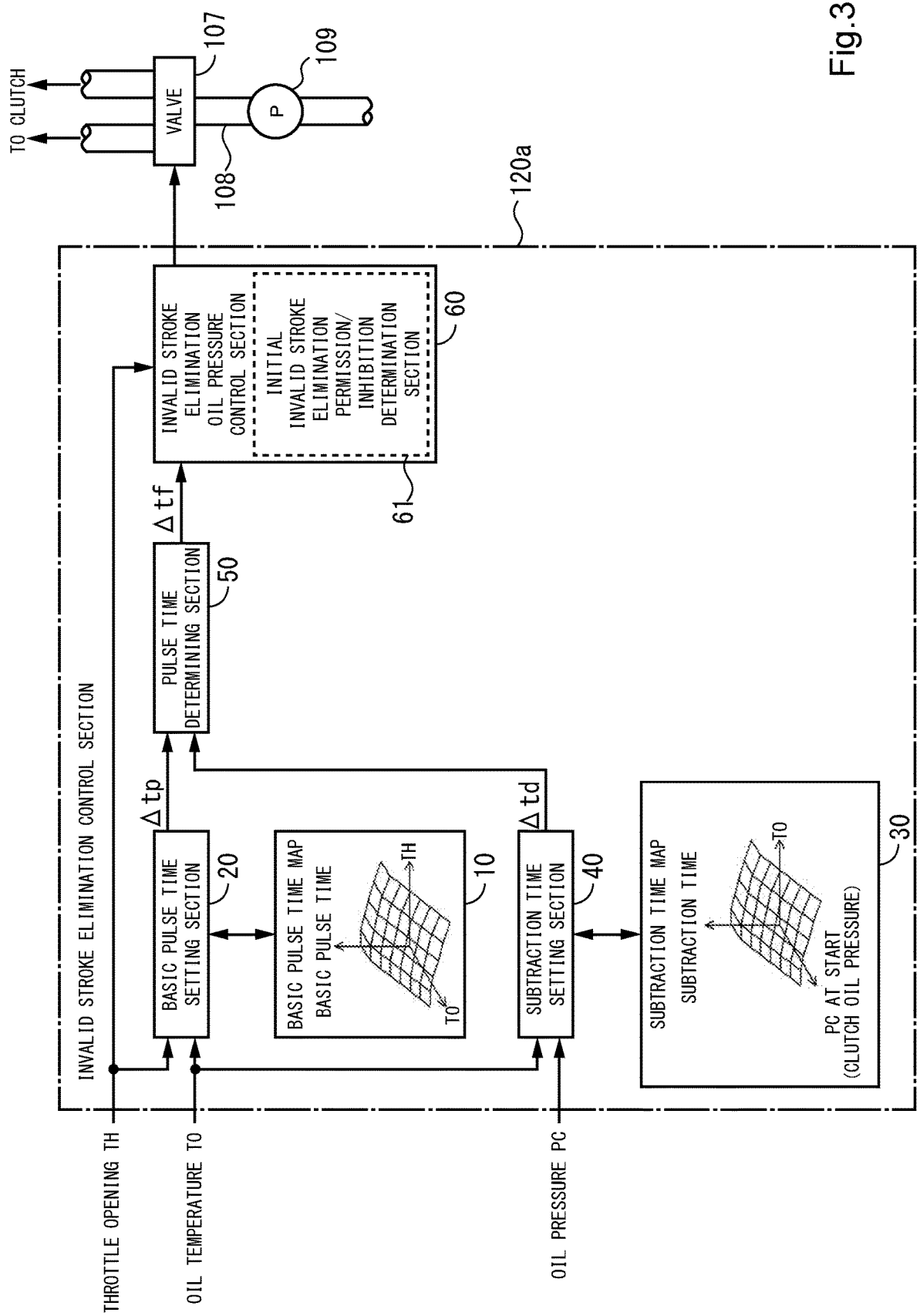
FIG. 3 is a functional block diagram depicting the configuration of an invalid stroke elimination control section for making appropriate the clutch oil pressure at the time of invalid stroke elimination.

FIG. 3 is a functional block diagram depicting the configuration of an invalid stroke elimination control section 120a that is mounted in the above-mentioned DCT control unit 120 for making appropriate the clutch oil pressure at the time of invalid stroke elimination. In FIG. 3, configurations that are not necessary for illustrating the present inventions are not depicted.

Basic pulse time periods for initial invalid stroke elimination for applying an initial oil pressure, which is greater than an oil pressure during a preparatory time for invalid stroke elimination, in a pulsed form for a predetermined time, with oil temperature TO and throttle opening TH as parameters, at the time of starting invalid stroke elimination, are registered in a basic pulse time map 10. A basic pulse time setting section 20 determines a basic pulse time $\Delta tp$ for initial invalid stroke elimination by applying current values of oil temperature TO and throttle opening TH to the basic pulse time map 10.

A subtraction time for shortening the basic pulse time $\Delta tp$ using the oil temperature TO and clutch oil pressure PC (PC1 or PC2) as parameters is registered in a subtraction time map 30. A subtraction time setting section 40 determines a subtraction time $\Delta td$ by applying current values of oil temperature TO and clutch oil pressure PC to the subtraction time map 30.

A pulse time determining section 50 determines a predetermined initial invalid stroke elimination pulse time $\Delta tf$ by subtracting the subtraction time $\Delta td$ from the basic pulse time $\Delta tp$.

An invalid stroke elimination oil pressure control section 60 determines invalid stroke elimination switching timings on the basis of the throttle opening TH, and controls the opening (position) of the above-mentioned valve 107 according to each of the timings, to thereby regulate the clutch oil pressure in the above-mentioned oil passage 108, thereby controlling the clutch capacity.

In the invalid stroke elimination oil pressure control section 60, an initial invalid stroke elimination permission/inhibition determination section 61 determines, at a starting timing of initial invalid stroke elimination, whether or not an elapsed time $\Delta t$ from the execution timing of the preceding initial invalid stroke elimination is within the predetermined inhibition period $\Delta tb$. If the elapsed time $\Delta t$ is within the predetermined inhibition period $\Delta tb$, this-time initial invalid stroke elimination is inhibited.

Figure 4A:
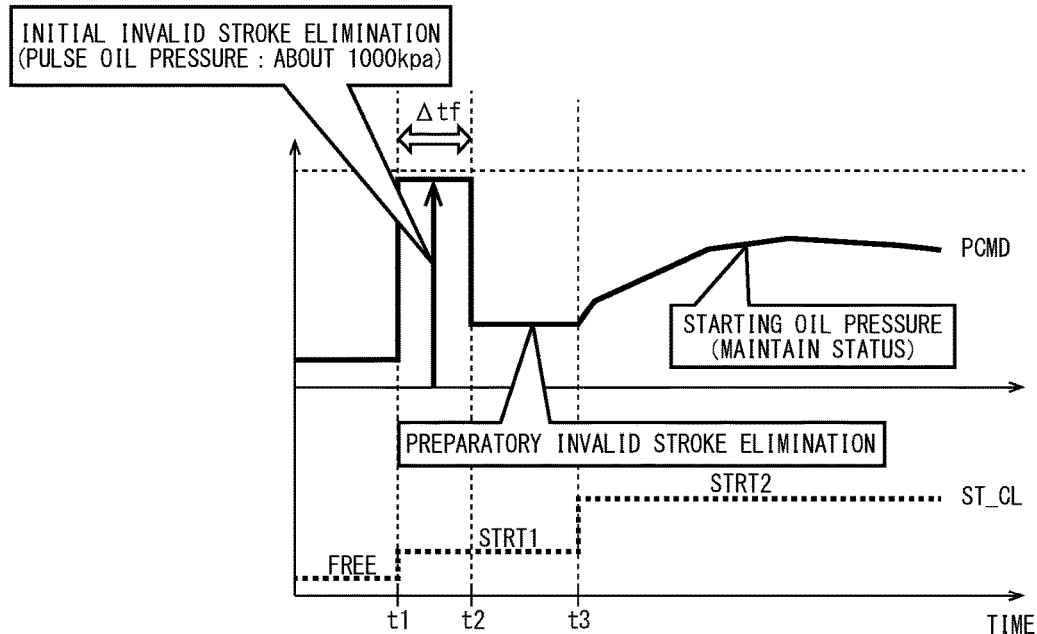
Figure 4B:
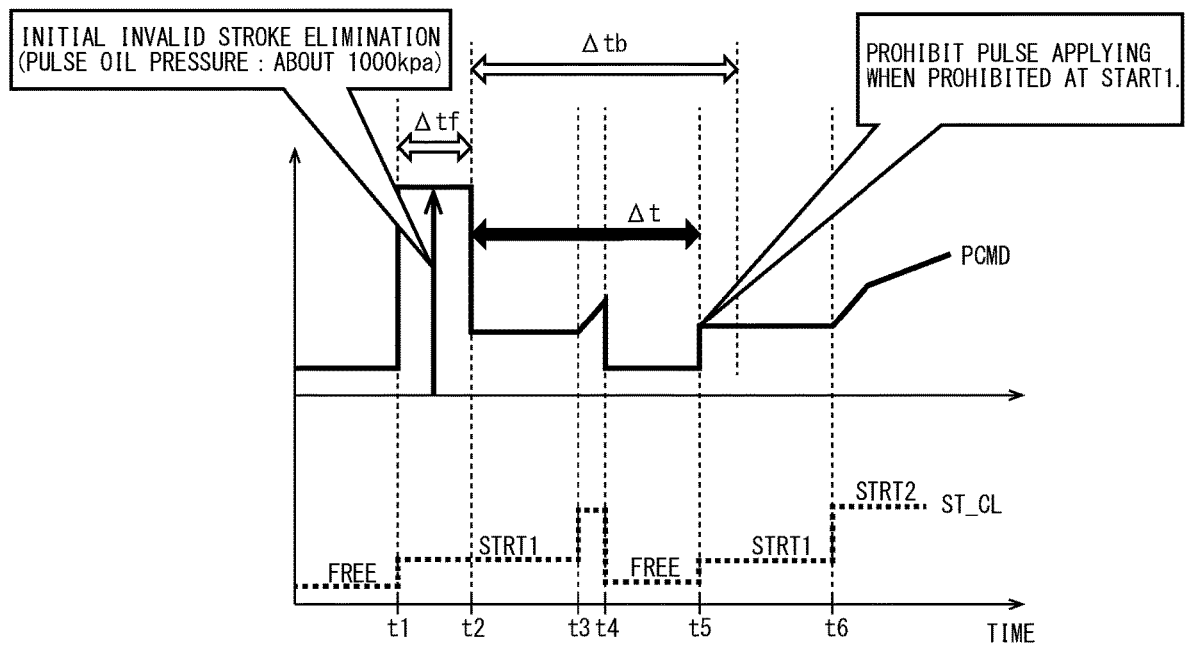
FIG. 4B depicts time charts of clutch oil pressure during control of invalid stroke elimination when the throttle opening is returned from ON to OFF immediately after a starting operation and the starting is thereby interrupted.

FIG. 4A depicts time charts of clutch oil pressure during control of invalid stroke elimination by the invalid stroke elimination oil pressure control section 60 when starting of the vehicle is reached in the manner of interlocking with a starting operation of shifting the throttle from OFF to ON. FIG. 4B depicts time charts of clutch oil pressure during control of invalid stroke elimination by the invalid stroke elimination oil pressure control section 60 when the throttle opening is returned from ON to OFF immediately after a starting operation and the starting is thereby interrupted.

The valve 107 is controlled in such a manner that an oil pressure for maintaining the clutch in a disengaged state (FREE) is generated until the throttle opening is shifted from OFF to ON at time t1. When the throttle is shifted from OFF to ON at time t1, the valve 107 is fully opened for the initial invalid stroke elimination pulse time Δtf determined by the pulse time determining section 50, whereby a clutch oil pressure of approximately 1,000 kpa is generated.

When the initial invalid stroke elimination pulse time Δtf is finished at time t2, the valve 107 is closed by a predetermined amount, whereby the clutch oil pressure is reduced to an invalid stroke elimination preparatory oil pressure lower than the initial invalid stroke elimination oil pressure.

Thereafter, when the throttle opening is further opened at time t3, as depicted in FIG. 4A, the valve 107 is controlled in such a manner as to generate a starting oil pressure which is higher than the invalid stroke elimination preparatory oil pressure and which is separately calculated based on throttle opening TH and engine rotational speed.

Meanwhile, when the throttle opening is further opened at time t3 but the throttle is again turned OFF at time t4 immediately after that, as depicted in FIG. 4B, the valve 107 is controlled in such a manner that the clutch oil pressure is returned to an oil pressure suitable for a disengaged state at the time of vehicle stop.

Thereafter, when the throttle is again shifted from OFF to ON at time t5, the elapsed time Δt from the execution timing of the preceding initial invalid stroke elimination (for example, the finishing time t2 thereof) is referred to, and it is determined whether or not the elapsed time Δt is within the above-mentioned inhibition period Δtb. If the elapsed time Δt is within the inhibition period Δtb, this-time initial invalid stroke elimination is inhibited, and the valve 107 is controlled in such a manner that a preparatory oil pressure for the invalid stroke elimination is applied.

According to the present embodiment, the initial invalid stroke elimination is inhibited from being performed again unless a predetermined inhibition period has elapsed from the execution of the preceding initial invalid stroke elimination. Therefore, the clutch pressure is prevented from being raised excessively due to repetition of the initial invalid stroke elimination in a short time.

According to the present embodiment, the predetermined time of the initial invalid stroke elimination is shortened according to the oil pressure at the starting timing thereof; therefore, an excessive initial invalid stroke elimination can be avoided even in the case where the initial invalid stroke elimination is started from a state in which the clutch oil pressure in a vehicle stop condition has not been sufficiently lowered due to such a reason as a low oil temperature.

Note that while an example in which the present invention is applied to a DCT clutch device has been described in the above embodiment, this is not restrictive of the present invention, and the present invention is applicable to any kind of clutch so long as the clutch is a friction plate type hydraulic clutch for effecting and interrupting transmission of a driving force between a drive wheel and an engine.

In addition, while the inhibition period Δtb for which invalid stroke elimination is inhibited from being conducted again has been described as a fixed period in the above embodiment, this is not limitative of the present invention, and the inhibition period Δtb may be dynamically changed according to oil temperature TO.

Figure 5:
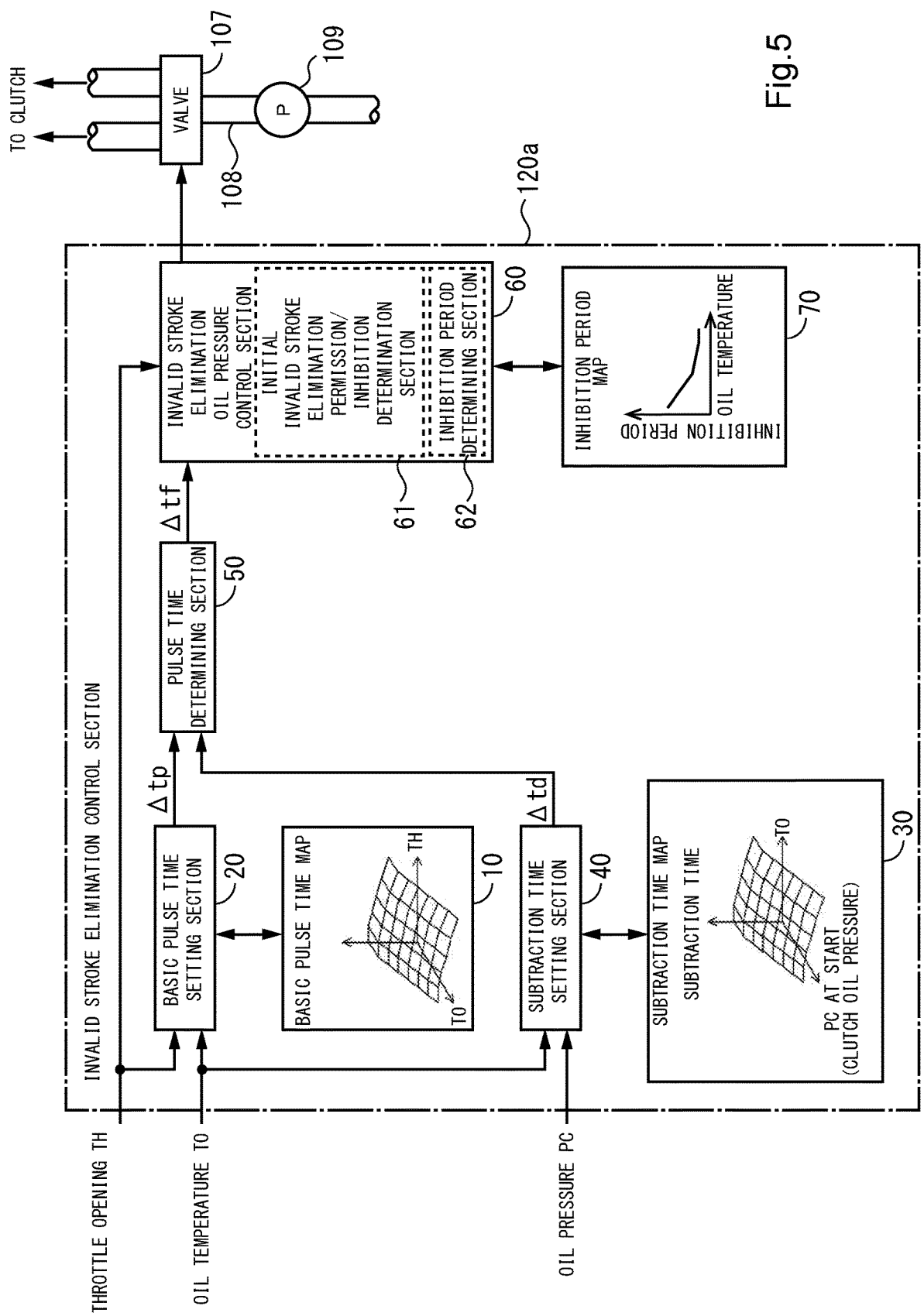

FIG. 5 is a block diagram depicting the configuration of an embodiment wherein the inhibition period Δtb is changed according to oil temperature TO, wherein the same symbols as used above denote sections which are the same or equivalent to the above-described sections.

In an inhibition period map 70, a relation between the oil temperature TO and the inhibition period Δtb is set such that the inhibition period Δtb is shorter as the oil temperature TO is higher and oil viscosity is lower. The inhibition period determining section 62 dynamically determines the inhibition period Δtb by applying the current value of the oil temperature TO to the inhibition period map 70.

According to the present embodiment, the inhibition period Δtb is prolonged in a situation in which the oil temperature TO is low and a swift lowering of the clutch oil pressure cannot be expected even if the opening of valve 107 is increased; therefore, the inhibition period Mb is optimized notwithstanding the oil temperature TO, and the clutch oil pressure can be prevented from being raised excessively due to repetition of invalid stroke elimination in a short period.

REFERENCE SIGNS LIST

10 . . . basic pulse time map, 20 . . . basic pulse time setting section, 30 . . . subtraction time map, 40 . . . subtraction time setting section, 50 . . . pulse time determining section, 60 . . . invalid stroke elimination oil pressure control section, 61 . . . initial invalid stroke elimination permission/inhibition determination section, 62 . . . inhibition period determining section, 70 . . . inhibition period map, 107 . . . valve, 108 . . . oil passage, 120 . . . DCT control unit, 120a . . . invalid stroke elimination control section

What is claimed is:

1. A clutch control device for applying a stand-by oil pressure for invalid stroke elimination to an oil passage of a friction plate type hydraulic clutch for effecting and interrupting transmission of a driving force between a drive wheel and an engine, the clutch control device comprising:
a central processing unit comprising:
an invalid stroke elimination oil pressure control section configured to generate an initial invalid stroke elimination oil pressure in excess of an invalid stroke elimination preparatory oil pressure for a predetermined time at the time of starting invalid stroke elimination which is started according to a throttle operation;
an initial invalid stroke elimination permission/inhibition determination section configured to generate an invalid stroke elimination preparatory oil pressure after the initial invalid stroke elimination; and
an inhibition period determining section configured to inhibit this-time initial invalid stroke elimination and continuing the invalid stroke elimination preparatory oil pressure when an elapsed time from execution of preceding initial invalid stroke elimination to a timing of the this-time initial invalid stroke elimination is within a predetermined inhibition period.

2. The clutch control device according to claim 1, wherein the predetermined time is determined based on oil temperature and throttle opening.

3. The clutch control device according to claim 2, wherein the central processing unit is further configured to shorten the predetermined time by a predetermined subtraction time according to an oil pressure at an inlet passage of the hydraulic clutch at a starting timing of invalid stroke elimination.

4. The clutch control device according to claim 1, wherein the inhibition period is determined based on oil temperature.

5. The clutch control device according to claim 2, wherein the inhibition period is determined based on oil temperature.

6. The clutch control device according to claim 3, wherein the inhibition period is determined based on oil temperature.

7. The clutch control device according to claim 1, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

8. The clutch control device according to claim 2, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

9. The clutch control device according to claim 3, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

10. The clutch control device according to claim 4, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

11. The clutch control device according to claim 5, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

12. The clutch control device according to claim 6, further comprising an oil pressure restriction valve for restricting an oil pressure generated by a hydraulic pump which generates the oil pressure, to a predetermined oil pressure,
wherein during the predetermined time, the oil pressure restriction valve is fully opened and the oil pressure from the hydraulic pump is introduced directly to the hydraulic clutch.

\* \* \* \* \*